(12) United States Patent
Furuta

(10) Patent No.: US 10,317,813 B2
(45) Date of Patent: Jun. 11, 2019

(54) IMAGE FORMING APPARATUS

(71) Applicant: CANON KABUSHIKI KAISHA, Tokyo (JP)

(72) Inventor: Yasutomo Furuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/782,497

(22) Filed: Oct. 12, 2017

(65) Prior Publication Data

US 2018/0106998 A1 Apr. 19, 2018

(30) Foreign Application Priority Data

Oct. 19, 2016 (JP) .................................. 2016-205214

(51) Int. Cl.

| G03G 15/043 | (2006.01) |
|---|---|
| G02B 26/12 | (2006.01) |
| G03G 15/00 | (2006.01) |
| H04N 1/113 | (2006.01) |
| G02B 26/08 | (2006.01) |

(52) U.S. Cl.
CPC ......... *G03G 15/043* (2013.01); *G02B 26/122* (2013.01); *G02B 26/124* (2013.01); *G03G 15/50* (2013.01); *H04N 1/1135* (2013.01); *G02B 26/085* (2013.01)

(58) Field of Classification Search
CPC .............. G03G 15/04; G03G 15/043; G03G 15/04036; G03G 15/04045; G03G 15/04054; G03G 15/04072; H04N 1/113; H04N 1/1135; B41J 2/47; B41J 2/435; B41J 2/471; G02B 26/10; G02B 26/12; G02B 26/085; G02B 26/122; G02B 26/127; G02B 26/128
See application file for complete search history.

(56) References Cited

U.S. PATENT DOCUMENTS

| 8,917,305 B2 | 12/2014 | Nakahata et al. . G03G 15/0415 |
|---|---|---|
| 9,261,809 B2 | 2/2016 | Furuta .............. G03G 15/04072 |
| 9,715,189 B2 | 7/2017 | Horiuchi et al. .... G03G 15/043 |
| 2015/0062676 A1 | 3/2015 | Nito ...................... G03G 15/50 |

(Continued)

FOREIGN PATENT DOCUMENTS

JP 2015-049481 3/2015

*Primary Examiner* — Thomas S Giampaolo, II
(74) *Attorney, Agent, or Firm* — Venable LLP

(57) ABSTRACT

An image forming apparatus includes a control unit: starting up a rotary polygon mirror based on a first signal output by a driving unit thereof; causing a light source to emit a laser-beam while controlling a rotational speed of the rotary polygon mirror based on the first signal to acquire a second signal output from a detecting unit of the laser-beam; turning off the light source after acquiring a phase relation between the first and second signals; causing a charging unit to charge a photosensitive member; making the laser-beam to enter onto the detecting unit without exposing the photosensitive member based on the phase relation in response to the rotational speed reaching a target speed; controlling the rotational speed based on the second signal in response to the laser-beam being entered; and starting image formation in response to the rotational speed converging within a predetermined range including the target speed.

5 Claims, 9 Drawing Sheets

(56) References Cited

U.S. PATENT DOCUMENTS

| | | | |
|---|---|---|---|
| 2015/0293350 A1* | 10/2015 | Sato | G03G 15/043 347/118 |
| 2016/0063362 A1* | 3/2016 | Abe | G06K 15/1219 399/51 |
| 2016/0147170 A1 | 5/2016 | Furuta | G03G 15/043 |
| 2017/0019560 A1 | 1/2017 | Horiuchi et al. | H04N 1/4052 |
| 2017/0019561 A1 | 1/2017 | Furuta | H04N 1/4052 |
| 2017/0019562 A1 | 1/2017 | Furuta et al. | H04N 1/4052 |
| 2017/0041489 A1 | 2/2017 | Furuta | H04N 1/0408 |
| 2017/0280001 A1 | 9/2017 | Furuta | H04N 1/2346 |
| 2017/0285510 A1 | 10/2017 | Furuta et al. | G03G 15/043 |

* cited by examiner

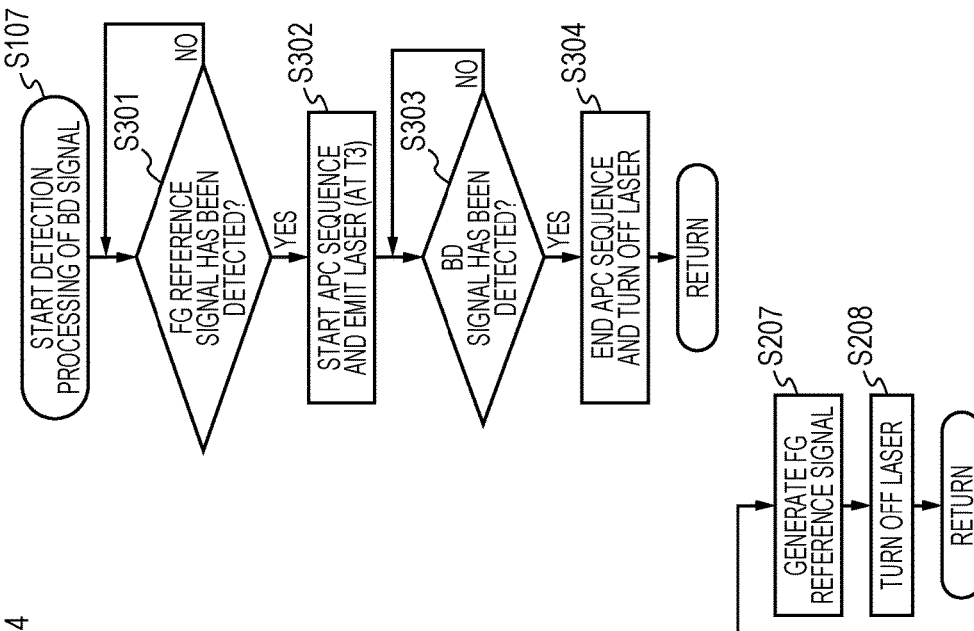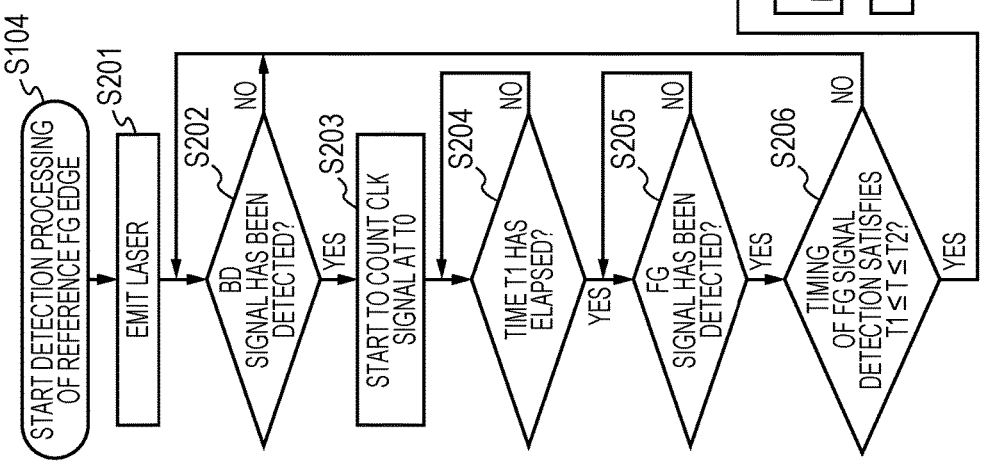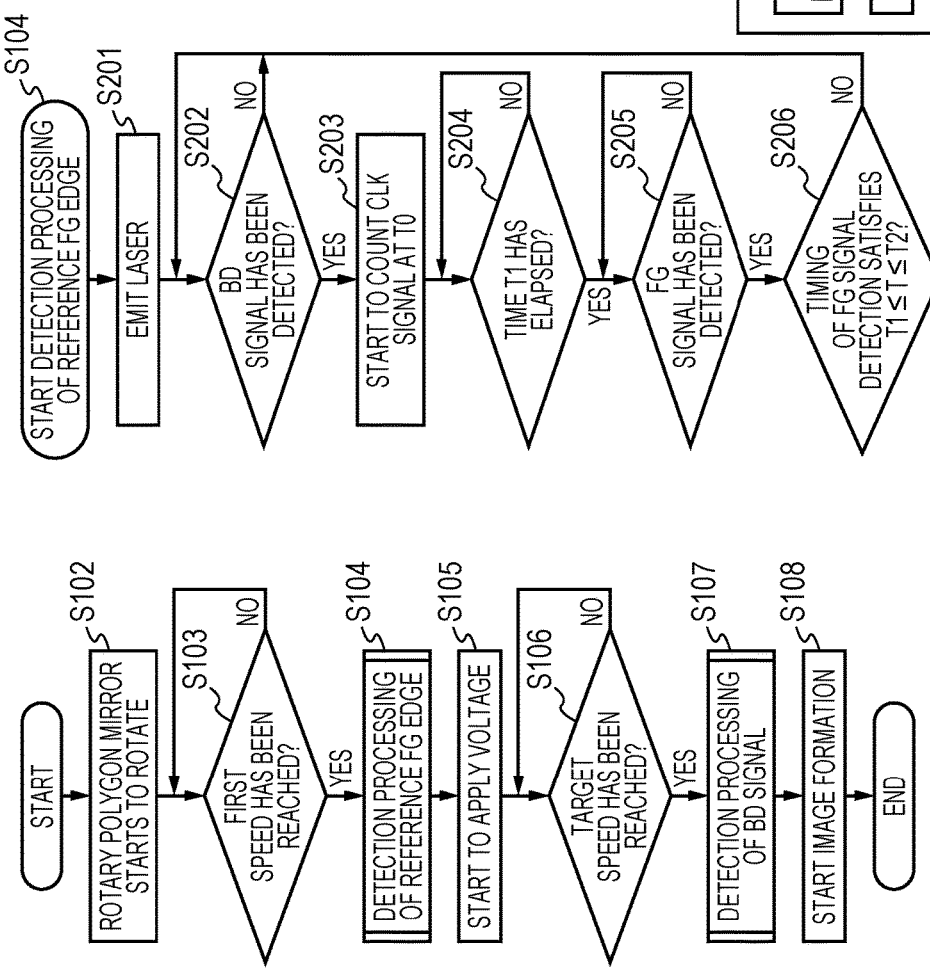

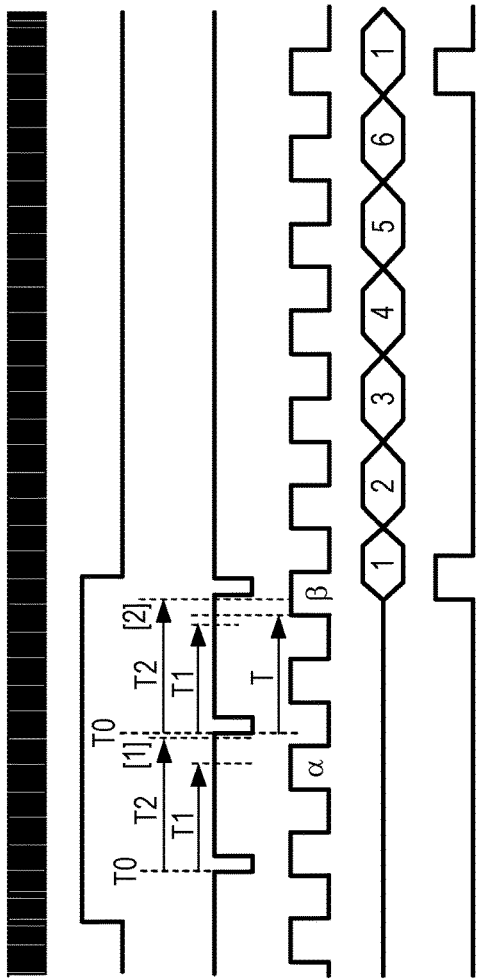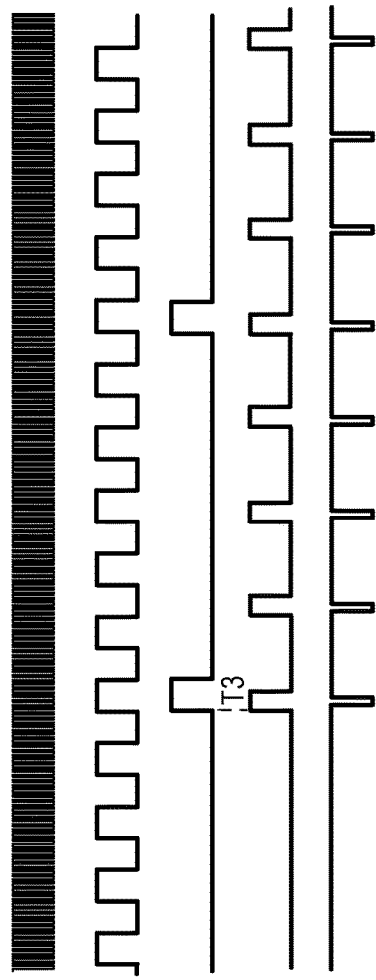

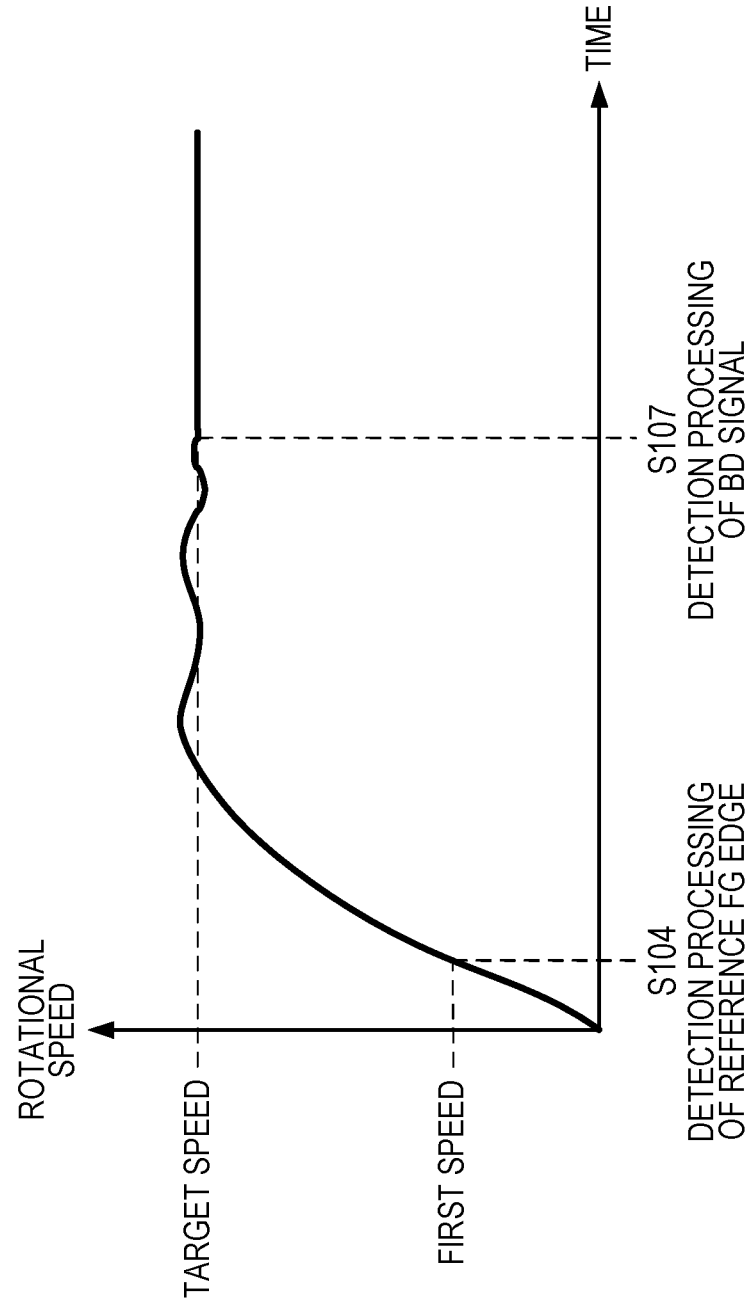

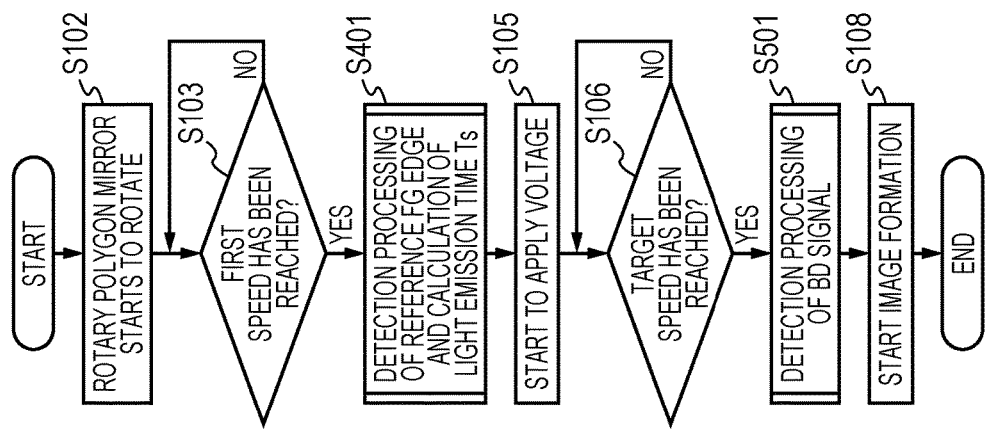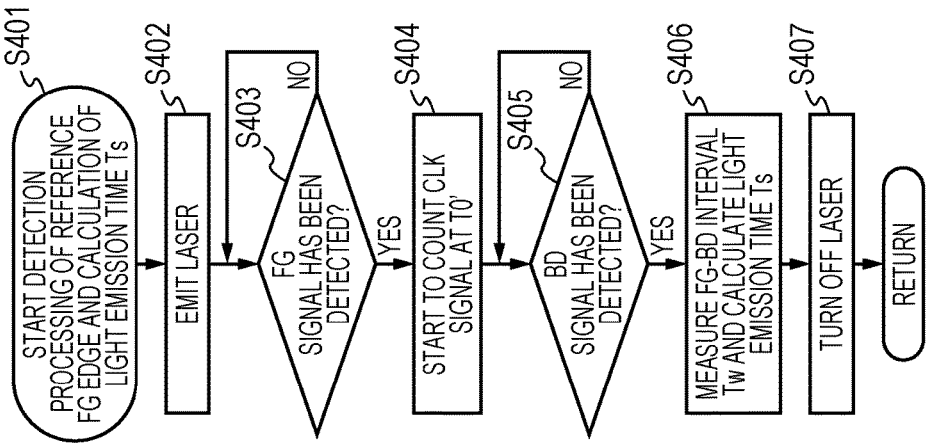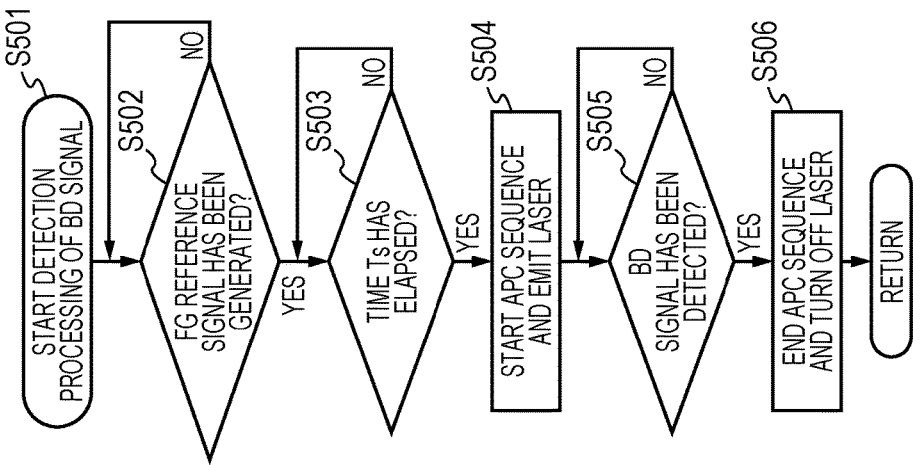

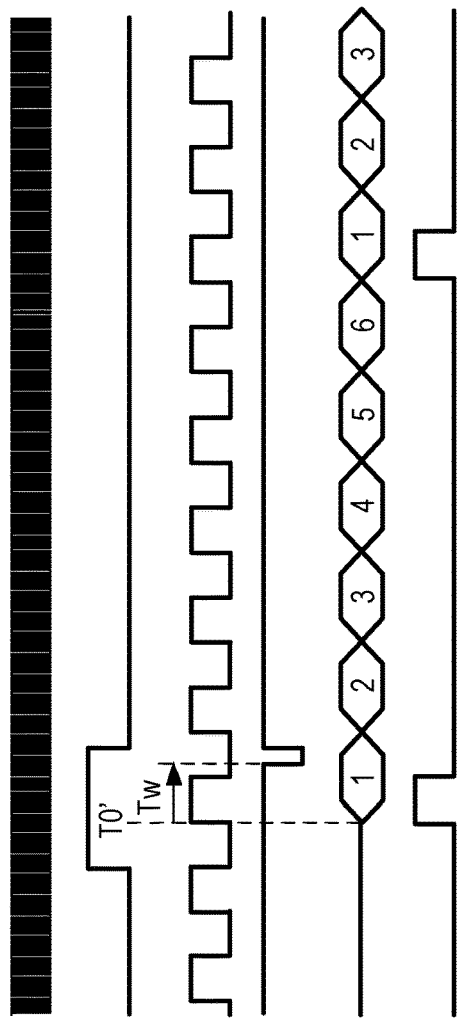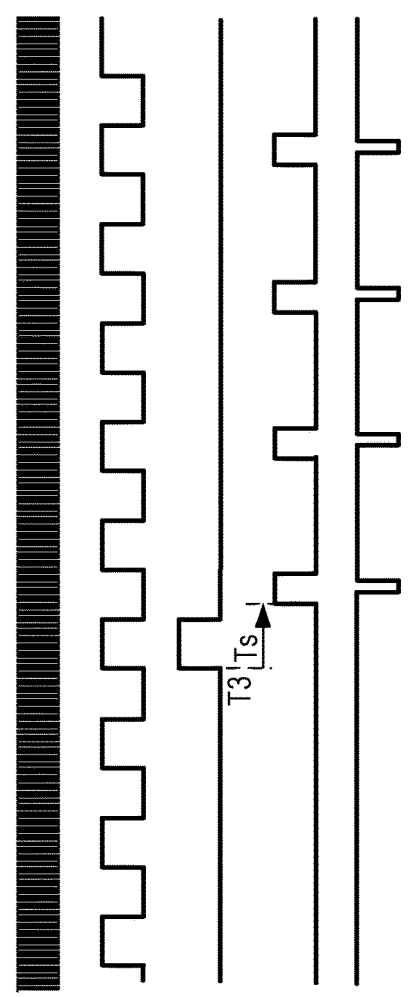

IMAGE FORMING APPARATUS

BACKGROUND OF THE INVENTION

Field of the Invention

The present invention relates to an image forming apparatus including an optical scanning device.

Description of the Related Art

In an image forming apparatus of an electrophotographic type such as a digital copying machine, a scheme is known in which a charged photosensitive member is exposed by an optical scanning device to form an electrostatic latent image, and an image is formed through subsequent steps of development, transfer, and fixing. The optical scanning device includes a semiconductor laser configured to be turned on according to an image signal, a rotary polygon mirror configured to perform a scan with a laser beam from the semiconductor laser turned on, and a lens configured to condense the laser beam on the photosensitive member. The optical scanning device includes an optical sensor for sensing a position of the laser beam used for the scanning (Beam Detector; hereafter, referred to as BD). Upon receiving the laser beam, the BD generates a light reception signal. Based on a generation timing of the light reception signal (hereafter, referred to as a BD signal) (detection timing of the laser beam), a writing start position of an image in a scanning direction of the laser beam is controlled, and a rotational speed of the rotary polygon mirror is controlled. When a user gives instructions of image formation start, the rotary polygon mirror starts rotating, then the rotational speed of the rotary polygon mirror reaches a predetermined speed. After the rotational speed of the rotary polygon mirror has reached the predetermined speed, the semiconductor laser starts light emission operation (hereafter, referred to as BD search), a timing of scanning with the laser beam on a light receiving surface of the BD is acquired within one scanning period of the laser beam.

An image forming apparatus disclosed in Japanese Patent Application Laid-Open No. 2015-49481 starts up a rotary polygon mirror based on a period of an FG signal which is generated according to a magnetic pole pattern of a permanent magnet in a motor. The image forming apparatus causes a semiconductor laser to be turned on continuously, or intermittently with a high period in response to a rotational speed of the rotary polygon mirror reaching a predetermined speed. By the image forming apparatus causing the semiconductor laser to be turned on continuously, or intermittently with the high period, a BD is scanned with the laser beam within one scanning period, and the BD generates a BD signal. Based on a generation timing of the BD signal, the image forming apparatus specifies a timing of scanning with the laser beam on the BD within the one scanning period. Based on the specified result, the image forming apparatus causes the semiconductor laser to emit a laser beam. Thereby the laser beam can be entered onto the BD without outputting a laser beam with which a photosensitive member is scanned. The BD signal generated stably allows use of a period of the BD signal to control the rotational speed of the rotary polygon mirror. Then the image forming apparatus starts image formation as the rotational speed of the rotary polygon mirror is stabilized.

In BD search operation, the photosensitive member is scanned with the laser beam before the BD signal is generated. There is an apparatus in which a charge device and a developing device are started up before the BD search. In such an apparatus, a toner image is formed by scanning with a laser beam on a photosensitive member, and toner is consumed. In order to suppress toner consumption, the charge device and the developing device have to be started up after the BD search. In such a case, other devices can be started up only after the BD search is finished. Such a configuration raises a problem in that a long time is required as a startup time of the entire apparatus.

The present invention is made in such circumstances. The present invention is directed to shortening a startup time of the entire image forming apparatus without forming an unnecessary image on a photosensitive member.

SUMMARY OF THE INVENTION

To solve the problem described above, the present invention includes the following configuration.

An image forming apparatus including: a light source; a rotary polygon mirror configured to scan with a laser beam emitted from the light source; a driving unit configured to drive the rotary polygon mirror and output a first signal corresponding to rotation of the rotary polygon mirror; a photosensitive member on which a latent image is formed by scanning with the laser beam by the rotary polygon mirror; a charging unit configured to charge the photosensitive member before the latent image is formed on the photosensitive member; a developing unit configured to develop the latent image formed on the photosensitive member with toner to form a toner image; a detecting unit provided in a second region obtained by excepting a first region, which is to be scanned with the laser beam to form the latent image on the photosensitive member, from a range to be scanned with the laser beam, the detecting unit being configured to output a second signal in response to detection of the laser beam; a control unit configured to control a light amount of the laser beam to be emitted from the light source onto the second region for every scan of the laser beam; and the control unit which: i) starts up the rotary polygon mirror based on the first signal output by the driving unit; ii) causes the light source to emit the laser beam while controlling a rotational speed of the started rotary polygon mirror based on the first signal to acquire the second signal output from the detecting unit; iii) acquires a phase relation between the first signal and the second signal; iv) turns off the light source after acquiring the phase relation; v) causes the developing unit to apply an electric charge to the toner and causes the charging unit to charge the photosensitive member, after turning off the light source; vi) makes the laser beam to enter onto the detecting unit without exposing the photosensitive member based on the phase relation between the second signal and the first signal, in response to the rotational speed of the rotary polygon mirror reaching a target speed by control of the rotary polygon mirror with the first signal; vii) controls the rotational speed of the rotary polygon mirror with the output second signal, in response to the laser beam being entered onto the detecting unit; and viii) controls to start image formation in response to the rotational speed of the rotary polygon mirror converging within a predetermined range including the target speed.

Further features of the present invention will become apparent from the following description of exemplary embodiments with reference to the attached drawings.

BRIEF DESCRIPTION OF THE DRAWINGS

FIG. 5A is a flowchart illustrating a startup process of a rotary polygon mirror in Embodiment 1.

FIG. 5B is a flowchart illustrating a process for detection processing of Reference FG edge in Embodiment 1.

FIG. 5C is a flowchart illustrating a process for BD detection in Embodiment 1.

FIG. 6A is a timing diagram illustrating an operation mode 1 in Embodiment 1.

FIG. 6B is a timing diagram illustrating an operation mode 2 in Embodiment 1.

FIG. 7 is a graph illustrating execution timings of starting up and controlling the rotary polygon mirror in Embodiment 1.

FIG. 8A is a flowchart illustrating a startup process of a rotary polygon mirror in Embodiment 2.

FIG. 8B is a flowchart illustrating an operation process for detection processing of Reference FG edge and calculation of a light emission time period in Embodiment 2.

FIG. 8C is a flowchart illustrating a process for BD detection in Embodiment 2.

FIG. 9A is a timing diagram illustrating an operation mode 1 in Embodiment 2.

FIG. 9B is a timing diagram illustrating an operation mode 2 in Embodiment 2.

DESCRIPTION OF THE EMBODIMENTS

Preferred embodiments of the present invention will now be described in detail in accordance with the accompanying drawings.

Embodiments of the present invention are described below in detail with reference to the accompanying drawings. A main-scanning direction as a second direction is a direction in which a laser beam is scanned and is a rotation axis direction of a photosensitive drum. A sub-scanning direction as a first direction is a direction which is substantially perpendicular to the main-scanning direction and is a rotation direction of the photosensitive drum.

[Embodiment 1]
[Configuration of Entire Image Forming Apparatus]

Figure 1A:
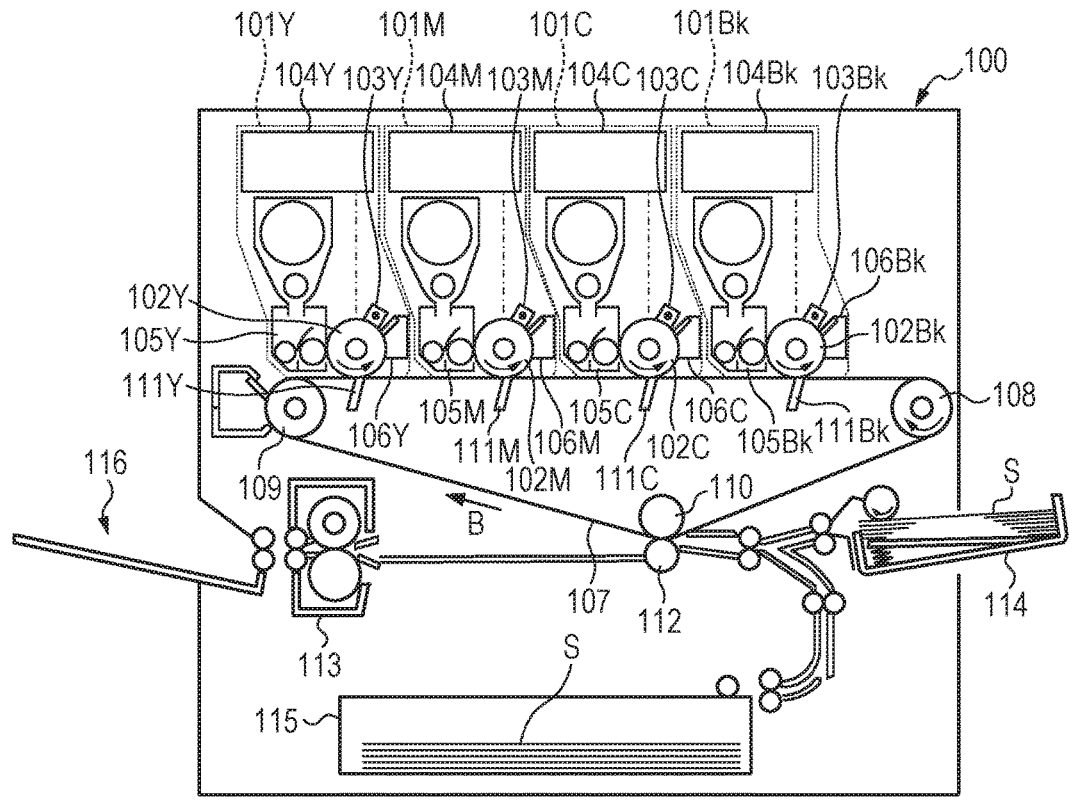
FIG. 1A illustrates a configuration of an image forming apparatus in Embodiments 1 and 2.

FIG. 1A is a schematic cross-sectional view of a digital full color printer (color image forming apparatus) which performs image formation using toners of a plurality of colors. With reference to FIG. 1A, an image forming apparatus 100 in Embodiment 1 is described. The image forming apparatus 100 includes four image forming portions (image forming portions) 101Y, 101M, 101C, and 101Bk (broken line portions) which form images in respective colors. The image forming portions 101Y, 101M, 101C, and 101Bk perform image formation using toners of yellow, magenta, cyan, and black, respectively. Indices Y, M, C and Bk denote yellow, magenta, cyan, and black, respectively and are hereinafter omitted except for a case of describing a specific color or specific colors.

The image forming portions 101 each include a photosensitive drum 102 as a photosensitive member. On a periphery of the photosensitive drum 102, a charge device 103, an optical scanning device 104, and a developing device 105 are provided. On a periphery of the photosensitive drum 102, a cleaning device 106 is disposed. Below the photosensitive drum 102, an endless-belt-like intermediate transfer belt 107 is disposed. The intermediate transfer belt 107 is looped around a drive roller 108 and driven rollers 109 and 110, and rotates in a direction indicated by an arrow B in FIG. 1A (clockwise direction) during image formation. At a position facing the photosensitive drum 102 across the intermediate transfer belt 107 (intermediate transfer member), a primary transfer device 111 is provided. The image forming apparatus 100 in the present embodiment includes secondarily transfer device 112 configured to transfer a toner image on the intermediate transfer belt 107 onto a sheet S as a recording medium, and a fixing device 113 configured to fix the toner image on the sheet S.

Steps from a charge step to a develop step of an image formation process performed by the image forming apparatus 100 are described. The image formation process is common to the image forming portions 101. Therefore, the image formation process is described exemplifying the image forming portion 101Y. The image formation process in the image forming portions 101M, 101C, and 101Bk is not described. The charge device 103Y as a charging unit of the image forming portion 101Y charges the photosensitive drum 102Y which is driven to rotate in an arrow direction in FIG. 1A (counterclockwise direction). The charged photosensitive drum 102Y is exposed with a semiconductor laser beam (hereafter, referred to as laser beam) illustrated by a dash-dot line which is emitted from the optical scanning device 104Y. The exposure forms an electrostatic latent image (latent image) on the rotating photosensitive drum 102Y (photosensitive member). The electrostatic latent image formed on the photosensitive drum 102Y is developed as a yellow toner image by the developing device 105Y as a developing unit. Similar steps are performed in the image forming portions 101M, 101C, and 101Bk.

The image formation process of a transfer step and subsequent steps thereof is described. The primary transfer devices 111 being transfer units with applied transfer voltage transfer yellow, magenta, cyan, and black toner images formed on the photosensitive drums 102 of the image forming portions 101 onto the intermediate transfer belt 107 being a transfer object. The transfer makes the toner images of the respective colors superimposed on top of one another on the intermediate transfer belt 107. In other words, the toner images of the four colors are transferred onto the intermediate transfer belt 107 (primary transfer). The toner images of the four colors transferred onto the intermediate transfer belt 107 are transferred by the secondarily transfer device 112 onto a sheet S which is conveyed from a manual feeding cassette 114 or a paper feeding cassette 115 to a second transfer portion (second transfer). The toner images on the sheet S which are unfixed are heated and fixed by the fixing device 113, so that a full color image on the sheet S is obtained. The sheet S with the image formed thereon is delivered to a delivering portion 116.

[Photosensitive Drum and Optical Scanning Device]

Figure 1B:
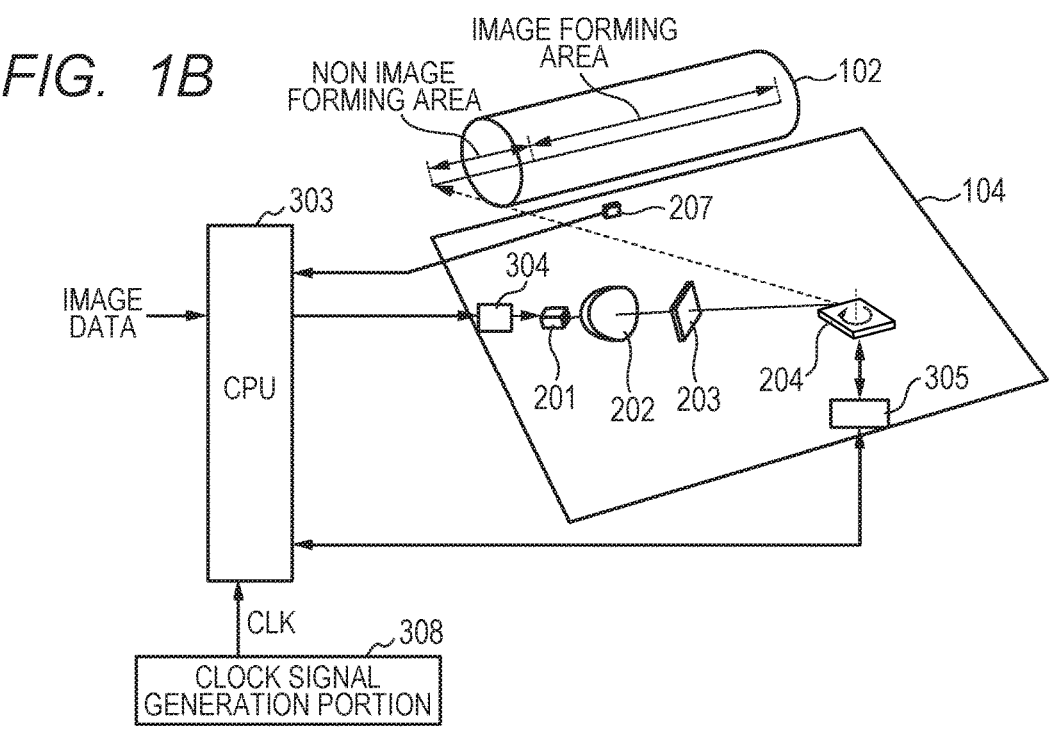
FIG. 1B illustrates a configuration of a periphery of a photosensitive drum and an optical scanning device in Embodiments 1 and 2.

FIG. 1B illustrates a configuration of the photosensitive drum 102, the optical scanning device 104, and a controlling portion of the optical scanning device 104. The optical scanning device 104 includes a laser light source 201 being a light source, a collimator lens 202, a cylindrical lens 203, and a rotary polygon mirror 204. The laser light source 201 is a multibeam semiconductor laser light source which includes a plurality of light emitting points. The light emitting points respectively emit laser beams (light beams). The collimator lens 202 forms the laser beams into parallel light beams. The cylindrical lens 203 condenses the laser beams which have passed through the collimator lens 202 in a sub-scanning direction. Although the laser light source 201 in the present embodiment is described as a light source including the plurality of arranged light emitting points by way of example, a light source including a single light source is similarly operated. The laser light source 201 is driven by a laser drive circuit 304. The rotary polygon mirror 204 includes a motor portion configured to perform rotating operation and reflecting mirrors which are attached to a motor shaft. Hereafter, surfaces of the reflecting mirrors of the rotary polygon mirror 204 are referred to as mirror surfaces. The number of mirrors of the rotary polygon mirror 204 is four in the present embodiment but may be a number other than four. The rotary polygon mirror 204 is driven by a drive unit (hereafter, referred to as mirror driving unit) 305 of the rotary polygon mirror being a driving unit. The optical scanning device 104 illustrated in FIG. 1B includes no fθ lens but may include an fθ lens.

The optical scanning device 104 includes a Beam Detector 207 (hereafter, referred to as BD 207) which is configured to detect laser beams deflected by the rotary polygon mirror 204 and to output a horizontal synchronization signal (hereafter, referred to as BD signal) being a second signal in response to detect the laser beams. The photosensitive drum 102 is scanned with the laser beams emitted from the optical scanning device 104. A scanning direction with the laser beams is substantially parallel to a rotation axis of the photosensitive drum 102. The optical scanning device 104 moves (scans with) the laser beams emitted from the laser light source in the main-scanning direction every time a mirror surface of the rotary polygon mirror 204 scans over the photosensitive drum 102, so as to form scanning lines as many as the light emitting points, simultaneously.

A scanned region in the main-scanning direction of the light beams scanned by the rotary polygon mirror 204 includes a non image forming area and an image forming area. The image forming area being a first region is an area, where scanned with the light beams to form a latent image on the photosensitive drum 102, of the areas scanned with the light beams. The non image forming area being a second region is an area, obtained by excepting the image forming area from the entire scanned region of the light beams. The non image forming area is divided into two areas which correspond to both end areas of the photosensitive drum 102 in the main-scanning direction. The BD 207 is provided in one of the two non image forming areas. The BD 207 also functions as a detecting unit configured to detect a position of a light beam scanned in the main-scanning direction.

A CPU 303 being a control unit of the optical scanning device 104, and a clock signal generation portion 308 are described. The CPU 303 and the clock signal generation portion 308 are attached to the image forming apparatus 100. The clock signal generation portion 308 outputs a clock signal CLK to the CPU 303. The clock signal CLK is a clock signal illustrated as (i) in FIGS. 6A and 6B and is hereafter referred to as a CLK signal.

The controlling portion (CPU 303) of the optical scanning device 104 is described. To the CPU 303, image data is input from an image controller (not illustrated) configured to generate the image data. The CPU 303 is connected to the BD 207, the laser drive circuit 304, and the mirror driving unit 305.

The mirror driving unit 305 generates a synchronization signal being a first signal (hereafter, referred to as FG signal) according to rotation of the rotary polygon mirror 204. The mirror driving unit 305 generates a FG signal including a predetermined number of pulses, for example, six pulses for every rotation of the rotary polygon mirror 204. The CPU 303 instructs the mirror driving unit 305 to start the rotation. After instructing the mirror driving unit 305 to accelerate, while measuring the time interval between FG signals input from the mirror driving unit 305, the CPU 303 instructs to accelerate/decelerate the rotation so that a time interval between FG signals becomes a predetermined time interval.

[Drive Motor]

Figure 2A:
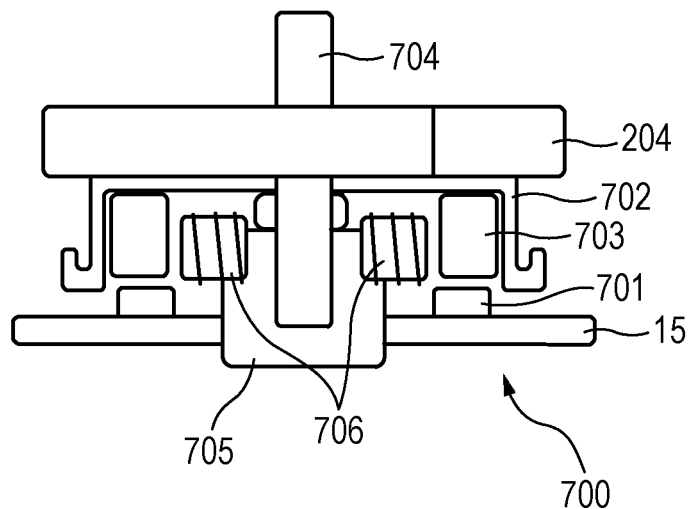
FIG. 2A is a cross-sectional view of a drive motor in Embodiments 1 and 2.

A motor portion configured to drive the rotary polygon mirror 204 is described. FIG. 2A is a cross-sectional view of a drive motor 700 and the rotary polygon mirror 204 which is fixed to the drive motor 700. The drive motor 700 includes a rotor 702, a permanent magnet 703, a rotation axis 704, a stator 705, and a coil 706. The drive motor 700 is fixed to a circuit board 15. To the stator 705 of the drive motor 700, a plurality of coils 706 is fixed. The rotation axis 704 is rotatably supported by a bearing which is provided in the stator 705 and is configured to rotate in the bearing. The rotor 702 is fixed to the rotation axis 704. The permanent magnet 703 is fixed to the rotor 702. The rotary polygon mirror 204 is assembled to the rotor 702 when the optical scanning device 104 is assembled. The rotary polygon mirror 204 is pressed against the rotor 702 by a pressing member (not illustrated).

Figure 2B:
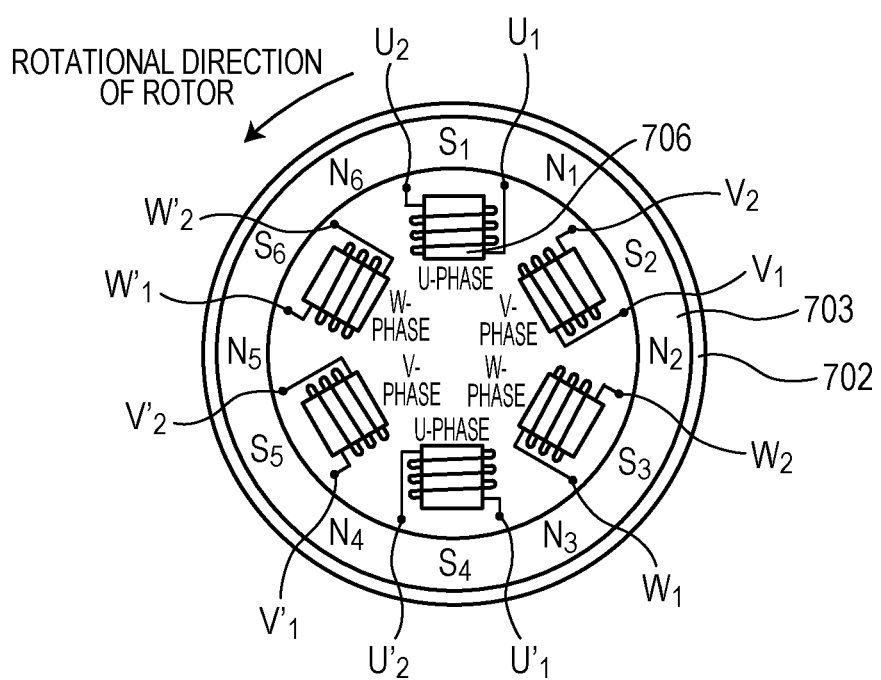
FIG. 2B is a plan view of the drive motor in Embodiments 1 and 2.

FIG. 2B illustrates the rotor 702, the permanent magnet 703, and the coils 706 when the drive motor 700 illustrated in FIG. 2A is viewed from above in the rotation axis direction. The rotor 702 is configured to rotate in an arrow direction (counterclockwise direction). As illustrated in FIG. 2B, the permanent magnet 703 is magnetized to have S poles and N poles which alternate along a rotation direction of the rotor 702. Although the permanent magnet 703 illustrated in FIG. 2B is an example of a case where the number of sets of an S pole and an N pole is six as a magnetization pattern period, the permanent magnet 703 may have another magnetization pattern period.

The plurality of coils 706 is supplied with current and a timing of the supply is controlled. This control causes magnetic force to act between the plurality of coils 706 and the permanent magnet 703, so that the rotor 702 and the permanent magnet 703 rotate about the rotation axis 704 in an arrow direction.

Figure 3:
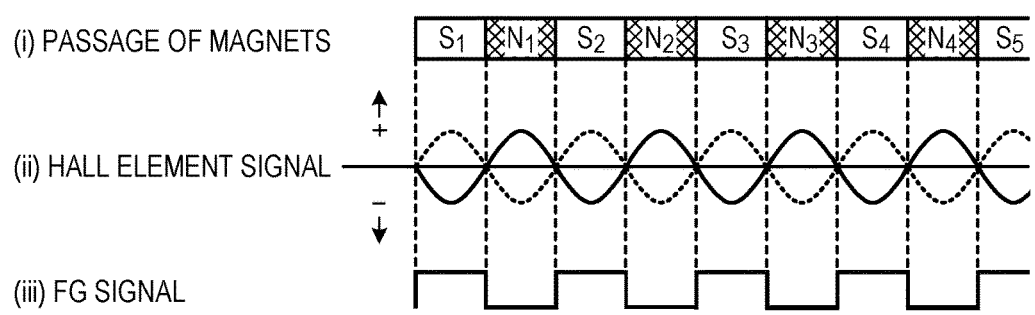
FIG. 3 illustrates a relation between a Hall element signal and an FG signal in Embodiments 1 and 2.

On the circuit board 15, Hall elements 701 are mounted. The Hall elements 701 detect magnetic flux changes caused by the rotation of the permanent magnet 703 and output the magnetic flux changes as Hall element signals. FIG. 3 illustrates output waveforms of the Hall elements 701 and a pulse waveform of the FG signal. In FIG. 3, (i) illustrates a passage of the magnetization pattern of the permanent magnet 703 (magnet). In FIG. 3, (ii) illustrates the Hall element signals output by the Hall elements 701. In FIG. 3, (iii) illustrates the FG signal which is generated by a waveform generation circuit 802 (see FIG. 4) based on the Hall element signals. As illustrated in FIG. 3, the magnetization pattern of the permanent magnet 703 passes by the Hall elements 701 in order of S1→N1→S2→N2→ . . . . The S poles and the N poles alternately passing causes the Hall elements 701 to indicate magnetic flux changes and to output a plurality of sinusoidal Hall element signals having phases which are different from one another by 180 degrees. The waveform generation circuit 802 generates a pulse-like FG signal based on intersections of the plurality of sinusoidal Hall element signals.

When the rotary polygon mirror 204 is assembled on the drive motor 700, a worker fixes the rotary polygon mirror 204 to the rotor 702 without grasping a positional relation between a position of a reflecting surface of the rotary polygon mirror 204 and the magnetization pattern in the drive motor 700.

In the rotor 702 of the drive motor 700, the S poles and the N poles are not magnetized so as to have uniform widths. The Hall element signals output by the Hall element 701 therefore deforms from sinusoidal waves. As a result, the period the FG signal output from waveform generation circuit 802 also varies. Accordingly, the FG signal has a low precision as compared with the BD signal.

[Control Block Diagram]

Figure 4:
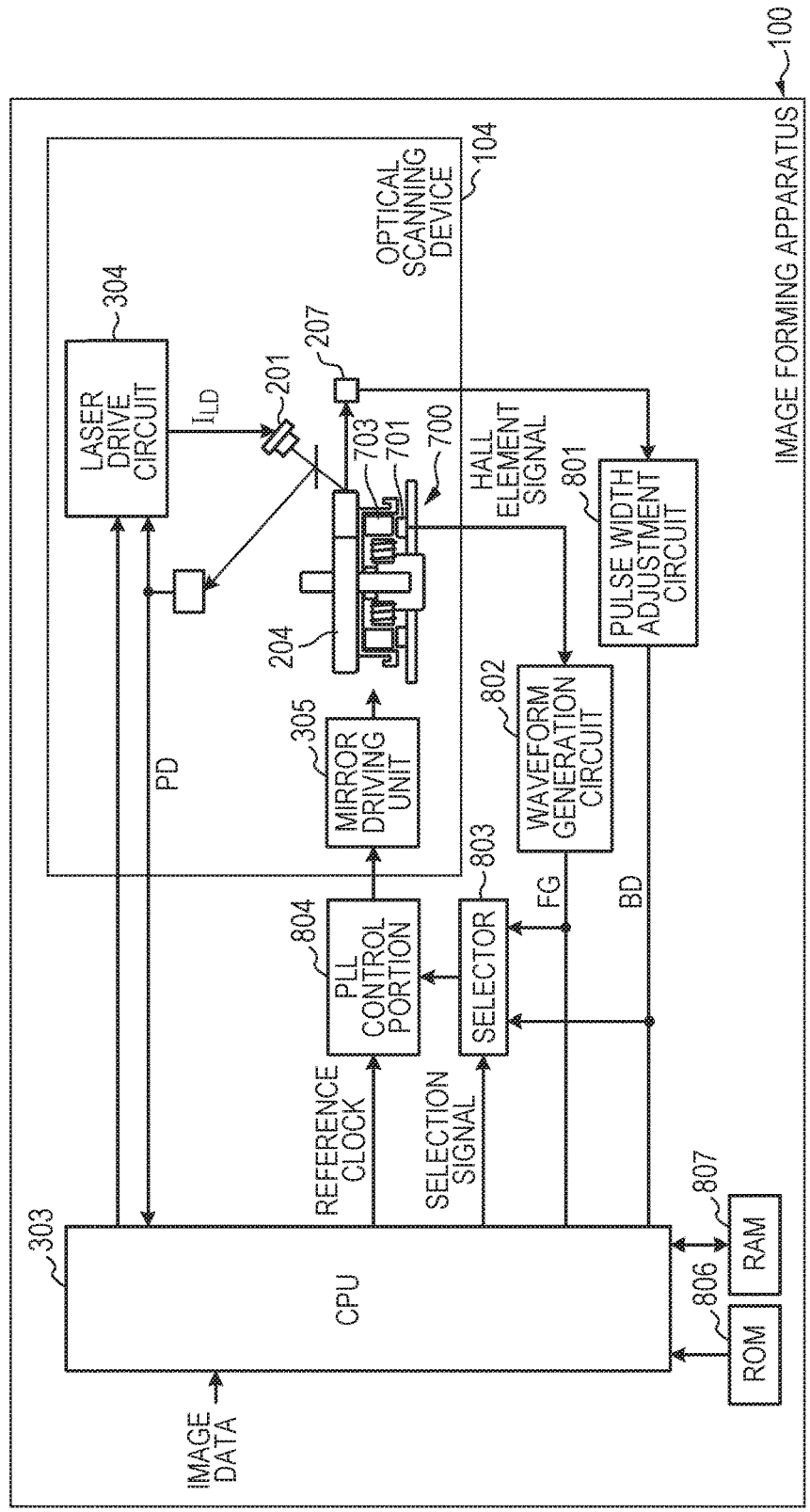
FIG. 4 is a control block diagram of the drive motor in Embodiments 1 and 2.

FIG. 4 is a control block diagram illustrating how the CPU 303 controls the drive motor 700. The CPU 303 outputs to a selector 803 a selection signal that causes the selector 803 to input the FG signal into a PLL control portion 804. According to the selection signal, the selector 803 inputs the FG signal into the PLL control portion 804 and does not input the BD signal into the PLL control portion 804. The CPU 303 outputs to the PLL control portion 804 a reference clock that corresponds to the FG signal. The reference clock corresponding to the FG signal is a periodic signal having a period corresponding to a target rotation number of the rotary polygon mirror 204. The PLL control portion 804 transmits one of an acceleration signal and a deceleration signal to the mirror driving unit 305 so that the period of the FG signal input into the PLL control portion 804 matches a period of the reference clock.

The CPU 303 outputs to the selector 803 a selection signal that causes the selector 803 to input the BD signal into the PLL control portion 804. The BD signal is input from the BD 207 into the selector 803 via a pulse width adjustment circuit 801. According to the selection signal, the selector 803 inputs the BD signal into the PLL control portion 804 and does not input the FG signal into the PLL control portion 804. The CPU 303 outputs to the PLL control portion 804 a reference clock that corresponds to the BD signal. The reference clock is a periodic signal having a period different from the period of the reference clock corresponding to the FG signal and corresponding to the target rotation number of the rotary polygon mirror 204. The PLL control portion 804 transmits one of an acceleration signal and a deceleration signal to the mirror driving unit 305 so that the period of the BD signal input into the PLL control portion 804 matches the period of the reference clock corresponding to the BD signal.

When starting up the drive motor 700 from a stopped state, the CPU 303 performs rotation control of the drive motor 700 based on a result of detecting the period of the FG signal. In response to the rotation reaching about the target rotation number, the CPU 303 switches the rotation control to rotation control of the drive motor 700 based on a result of detecting the period of the BD signal. While performing the rotation control of the drive motor 700 based on the result of detecting the period of the BD signal, the CPU 303 forms an image based on image data.

While the rotary polygon mirror 204 is stopped, no BD signal is generated. The CPU 303 therefore uses the FG signal to perform feedback control of the drive motor 700 in control during a period from startup of the rotary polygon mirror 204 to the rotation of the rotary polygon mirror 204 reaching about the target rotation speed.

While the FG signal is generated based on outputs of the Hall elements 701, the outputs of the Hall elements 701 contain high frequency noises. In contrast, output of the BD 207 being a light receiving element contains less noise than the outputs of the Hall elements 701. In other words, the period of the BD signal has smaller fluctuations than the period of the FG signal. The CPU 303 therefore switches the rotation control of the drive motor 700 from the feedback control using the FG signal to the feedback control using the BD signal before starting the image formation. During the image formation, the CPU 303 performs the feedback control of the drive motor 700 using the BD signal.

As described above, the CPU 303 can detect the rotational speed of the rotary polygon mirror 204 based on the FG signal input from the drive motor 700 and can control the rotational speed. In the present embodiment, the CPU 303 causes the laser light source 201 to emit light and acquires the BD signal from the BD 207 immediately after starting the rotation of the rotary polygon mirror 204. The CPU 303 acquires a phase relation between the acquired BD signal and the FG signal. In the present embodiment, the CPU 303 acquires a time interval between the BD signal and the FG signal, as an example of the phase relation. Based on the acquired time interval between the BD signal and the FG signal, the CPU 303 starts generating a signal which serves as a reference. Hereafter, an operation for starting the generation of the signal serving as a reference based on the time interval between the BD signal and the FG signal is referred to as an operation mode 1. The signal serving as a reference generated by the CPU 303 is referred to as an FG reference signal (third signal).

Upon starting the generation of the FG reference signal, the CPU 303 turns off the laser light source 201 and causes a power supply (not illustrated) being an application unit to start application of high voltage to the charge device 103, the developing device 105, and the intermediate transfer belt 107. The developing device 105 applies an electric charge to toner in order to develop a latent image on the photosensitive drum 102. Next, a rotation number of the rotary polygon mirror 204 per unit time reaches a predetermined rotation number. The CPU 303 thereafter causes the laser light source 201 to emit light beams according to the FG reference signal generated in the operation mode 1. From the laser light source 201, laser beams are emitted, scanned by the rotary polygon mirror 204, and entered onto the BD 207. Upon receiving the laser beams, the BD 207 outputs the BD signal and the CPU 303 receives the BD signal. Based on the phase relation between the BD signal and the FG signal which is acquired in the operation mode 1, the CPU 303 causes the laser beams to be entered onto the BD 207 without exposing the photosensitive drum 102. Hereafter, a mode for receiving the BD signal based on the FG reference signal generated by the CPU 303 is referred to as an operation mode 2. The operation modes 1 and 2 are described later. Subsequent to the operation mode 2, the CPU 303 transmits the image data input from the image controller to the laser drive circuit 304 so as to control drive of the laser light source 201, based on a writing start position which is detected using the received BD signal. In the next and subsequent scans, after a predetermined time has elapsed from a detection timing of a previous BD signal, the CPU 303 continuously receives the BD signal by causing the laser light source 201 to emit light beams in order to receive a next BD signal.

[General Operation]

FIG. 5A illustrates a process of the CPU 303 when starting up the rotary polygon mirror 204. Upon starting a job, the CPU 303 performs a process of step (hereafter, referred to as S) 102 and subsequent steps. In S102, the CPU 303 instructs the mirror driving unit 305 to start rotating the rotary polygon mirror 204. In S103, the CPU 303 measures the period of the FG signal from the FG signal generated by the mirror driving unit 305 and determines whether the rotational speed of the rotary polygon mirror 204 reaches a first speed. Here, the first speed is set so as to be a speed which is lower than a target speed of the rotary polygon mirror 204. When the CPU 303 determines in S103 that the rotational speed of the rotary polygon mirror 204 does not reach the first speed, the CPU 303 returns the process to S103. When the CPU 303 determines that the rotational speed reaches the first speed, the CPU 303 advances the process to S104. In S104, based on the FG signal generated by the mirror driving unit 305, the CPU 303 detects a pulse of the FG signal for generating the FG reference signal. A process of S104 is referred to as detection processing of Reference FG edge. The process of S104 is described later.

In S105, the CPU 303 causes the power supply (not illustrated) to start applying high voltage to the charge device 103, the developing device 105, and the intermediate transfer belt 107. In S106, the CPU 303 measures the period of the FG signal based on the FG signal generated by the mirror driving unit 305 and determines whether the rotational speed of the rotary polygon mirror 204 reaches the target speed. When the CPU 303 determines in S106 that the rotational speed of the rotary polygon mirror 204 does not reach the target speed, the CPU 303 returns the process to S106. When the CPU 303 determines that the rotational speed reaches the target speed, the CPU 303 advances the process to S107. In S107, the CPU 303 uses the laser drive circuit 304 to cause the laser light source 201 to emit light beams and detects the BD signal output from the BD 207. A process of the S107 is referred to as BD detection. In S108, the CPU 303 starts the image formation. When the job is finished, the CPU 303 finishes the process.

[Operation Mode 1: S104]

FIG. 5B illustrates the process for the detection processing of Reference FG edge which is performed by the CPU 303 in S104. The process of S104 is a process performed in the operation mode 1. In S201, the CPU 303 instructs the laser drive circuit 304 to cause the laser light source 201 to emit light beams so as to detect the BD signal. In S202, the CPU 303 determines whether the BD signal has been detected. When the CPU 303 determines in S202 that the BD signal has not been detected, the CPU 303 returns the process to S202. When the CPU 303 determines that the BD signal has been detected, the CPU 303 advances the process to S203. In S203, the CPU 303 starts counting the CLK signal generated by the clock signal generation portion 308. Assume that a time point of the start of counting is T0. In S204, from a result of counting the CLK signal, the CPU 303 determines whether a time period T1 as a predetermined first time period has elapsed. When the CPU 303 determines in S204 that the time period T1 has not elapsed, the CPU 303 returns the process to S204. When the CPU 303 determines that the time period T1 has elapsed, the CPU 303 advances the process to S205. In a subsequent process, the CPU 303 also counts the CLK signal generated by the clock signal generation portion 308 and determines whether the time period has elapsed. The counting and the determination in the subsequent process are not described.

In S205, the CPU 303 determines whether the FG signal generated by the mirror driving unit 305 has been detected. In other words, the CPU 303 determines whether a rising edge of the FG signal has been detected. When the CPU 303 determines in S205 that no rising edge of the FG signal has been detected, the CPU 303 returns the process to S205. When the CPU 303 determines that a rising edge of the FG signal has been detected, the CPU 303 advances the process to S206. In S206, the CPU 303 determines whether an elapsed time period T from the time point T0 falls within a range between the predetermined time period T1 and a time period T2 being a second time period (T1≤T≤T2). At a time point when the elapsed time period T elapses from the time point T0, a rising edge of the FG signal is detected in S205. The time period T2 is a time period longer than the time period T1. When the CPU 303 determines in S206 that the elapsed time period T falls out of the range between the time period T1 and the time period T2 (T2<T), the CPU 303 returns the process to S202. When the CPU 303 determines in S206 that the elapsed time period T falls within the range between the time period T1 and the time period T2 (T1≤T≤T2), the CPU 303 advances the process to S207. In S207, the CPU 303 generates the FG reference signal based on the FG signal the rising edge of which is detected in S205. Through the operation described above, the CPU 303 can advance the process to S207 with a timing when the FG signal is generated within the range between the time period T1 and the time period T2 (a timing when the FG signal rises) and can generate the FG reference signal in response to the FG signal generated within the range between the time period T1 and the time period T2. In S208, the CPU 303 causes the laser drive circuit 304 to turn off the laser light source 201, finishes operation of the detection processing of Reference FG edge, and returns the process to the process illustrated in FIG. 5A.

From S104 in FIG. 5A, the FG reference signal is generated with reference to the FG reference signal generated in a process of S207 in FIG. 5B so that one pulse is output for every rotation of the rotary polygon mirror 204. In the present embodiment, the mirror driving unit 305 outputs six pulses of the FG signal for every rotation of the rotary polygon mirror 204. The CPU 303 therefore selects one pulse for six pulses of the FG signal, as the FG reference signal. The CPU 303 sets a count value used for counting the FG signal (hereafter, FG count value) to one with a generation timing of the FG reference signal (S207). The CPU 303 thereafter counts rising edges of the FG signal generated by the mirror driving unit 305 and resets the FG count value to one at a pulse immediately following the FG count value reaching six. Subsequently, the CPU 303 generates the FG reference signal in synchronization with the FG signal which is generated while the FG count value takes one. The CPU 303 generates the FG reference signal based on the FG signal the rising edge of which is detected between the time period T1 and the time period T2. The CPU 303 however need not generate the FG reference signal. Once the FG signal the edge of which rises between the time period T1 and the time period T2 can be identified, the CPU 303 can thereafter perform operation of the counting without generating the FG reference signal. Such operation of the counting allows the CPU 303 to detect a timing as a reference comes periodically (e.g., for every six counts).

FIG. 6A illustrates a timing diagram of the detection processing of Reference FG edge in S104 (operation mode 1). In FIG. 6A, (i) illustrates the CLK signal generated by the clock signal generation portion 308. In FIG. 6A, (ii) illustrates a turn-on state of the laser light source 201 changed by the laser drive circuit 304 (Turn on laser), where a high level indicates that the laser light source 201 is turned on, and a low level indicates that the laser light source 201 is turned off. In FIG. 6A, (iii) illustrates the BD signal output from BD 207. In FIG. 6A, (iv) illustrates the FG signal generated by the mirror driving unit 305. In FIG. 6A, (v) illustrates how the CPU 303 counts the FG signal (the FG count value). In FIG. 6A, (vi) illustrates the FG reference signal generated by the CPU 303 in the process of S207. For all of the aboves, the horizontal axis represents time.

The BD signal output from the BD 207 is detected after the laser light source 201 is turned on. Falling of the BD signal detected after the laser light source 201 is turned on occurs at the time point T0 serving as a reference for starting the counting of the CLK signal in the process of S203 in FIG. 5B. The CPU 303 determines whether a rising edge of the FG signal has been detected after the time period T1 has elapsed from the time point T0 and before the time period T2 has not elapsed yet (S203 to S206 in FIG. 5B). For example, referring to [1] in FIG. 6A, since no rising edge of the FG signal has been detected within the range between the time period T1 and the time period T2, the CPU 303 does not regard a pulse α of the FG signal as the FG signal for generating the FG reference signal. Referring to [2] in FIG. 6A, since a rising edge of the FG signal has been detected within the range between the time period T1 and the time period T2, the CPU 303 regards a pulse β of the FG signal as the FG signal for generating the FG reference signal and generates FG reference signal as illustrated in (vi). The CPU 303 starts the counting operation of the FG signal with a timing when a rising edge of the FG signal is detected between the time period T1 and the time period T2 as illustrated in (v).

After generating the FG reference signal, the CPU 303 causes the laser drive circuit 304 to turn off the laser light source 201 as illustrated in (ii). In the present embodiment, the mirror driving unit 305 outputs six pulses of the FG signal for every rotation of the rotary polygon mirror 204. Accordingly, the CPU 303 thereafter resets the FG count value to one when counting the FG count value up to six and generates a next FG reference signal as illustrated in (v). After starting the generation of the FG reference signal and turning off the laser light source 201, the CPU 303 continues counting the FG signal. In such a manner, the CPU 303 continues outputting the FG reference signal on a cycle based on a predetermined pulse number of the FG signal.

The time period T1 corresponds to a timing of starting the scanning over the non image forming area when the rotational speed of the rotary polygon mirror 204 is a first rotational speed at a time of executing S104. The time period T2 corresponds to a timing of finishing the scanning over the non image forming area when the rotational speed of the rotary polygon mirror 204 is the first rotational speed at the time of executing S104. The time period T1 and the time period T2 are set according to the non image forming area. The time point T0 is a time point at which laser beams emitted from the laser light source 201 are reflected from the rotary polygon mirror 204 and received by the BD 207 (see FIG. 1B). The time period T1 is a time period taken for the scanning with the laser beams from a position corresponding to the BD 207 on a non image forming area on a side illustrated in FIG. 1B where the BD 207 is provided, to an end portion of a non image forming area on a side where the BD 207 is not provided. The time period T2 is a sum of a time period taken for the scanning with the laser beams from one end to another end of the non image forming area where the BD 207 is not provided, and a time period taken for the scanning with the laser beams from one end on the non image forming area where the BD 207 is provided to the position corresponding to the BD 207. In consideration of various variations, the time period T2 may be determined to be a time period taken for the scanning with the laser beams up to a predetermined position upstream of the BD 207 in the main-scanning direction. By detecting an FG signal generated between the time period T1 and the time period T2, the CPU 303 can identify an edge of the FG signal which is generated during a time period corresponding to the non image forming area.

[Operation Mode 2: S107]

FIG. 5C illustrates a process for the BD detection executed by the CPU 303 in S107. The process of S107 is a process performed in the operation mode 2. The CPU 303 starts operation of the BD detection in the process of S107. In S301, the CPU 303 monitors the FG reference signal which is generated in the operation of the detection processing of Reference FG edge in S104. Regarding a timing of a rising edge of the FG reference signal as a timing of detecting the FG reference signal, the CPU 303 determines whether the FG reference signal has been detected. When the CPU 303 determines in S301 that the FG reference signal has not been detected, the CPU 303 returns the process to S301. When the CPU 303 determines in S301 that the FG reference signal has been detected, the CPU 303 advances the process to S302. In S302, the CPU 303 starts an APC sequence and causes the laser drive circuit 304 to start light emission of the laser light source 201 in order to detect the BD signal. The CPU 303 executes the APC sequence for every scan of light beams emitted from the laser light source 201. In the APC sequence, an amount of light beams emitted from the laser light source 201 in the non image forming area is controlled. Assume that a time point of starting the light emission of the laser light source 201 is referred to as a time point T3. In S303, the CPU 303 determines whether the BD signal has been detected. When the CPU 303 determines in S303 that the BD signal has not been detected, the CPU 303 returns the process to S303. When the CPU 303 determines in S303 that the BD signal has been detected, the CPU 303 advances the process to S304. In S304, the CPU 303 finishes the APC sequence and causes the laser drive circuit 304 to turn off the laser light source 201. The CPU 303 finishes the process for the BD detection and returns the process to the process illustrated in FIG. 5A.

FIG. 6B illustrates a timing diagram of the process for the BD detection in S107 in FIG. 5A (operation mode 2). In FIG. 6B, (i) illustrates the CLK signal generated by the clock signal generation portion 308, and (ii) illustrates the FG signal generated by the mirror driving unit 305. In FIG. 6B, (iii) illustrates the FG reference signal generated by the CPU 303, as well as a timing of the time point T3. In FIG. 6B, (iv) illustrates an APC signal in the APC sequence. In FIG. 6B, (v) illustrates the BD signal which is detected by the CPU 303 in S302 or subsequent steps. For all of the aboves, the horizontal axis represents time.

In the present embodiment, the CPU 303 generates the APC signal for the light emission of the laser light source 201 with a timing when the rotation number of the rotary polygon mirror 204 reaches the target rotation number, and the FG reference signal is generated (time point T3). The APC signal is a signal for execution of auto power control (APC) operation. The APC signal is generated by the CPU 303. Upon receiving the APC signal from the CPU 303, the laser drive circuit 304 executes the APC operation. In order to execute the APC operation with the light emission of the laser light source 201 stabled, the CPU 303 generates the APC signal before receiving the BD signal. The laser drive circuit 304 causes the light emission of the laser light source 201 and detects an output of a photo diode which is built in the laser light source 201 (hereafter, referred to as PD). Based on a result of the detection by the PD, the laser drive circuit 304 increases/decreases a drive current of the laser light source 201 so as to control the light amount from the laser light source 201 to a predetermined light amount. The APC operation has a function of always controlling the light amount from the laser light source 201 to the predetermined light amount and a function of performing the BD detection by the light emission on the BD 207. In order to stabilize the light amount from the laser light source 201, the CPU 303 causes the laser drive circuit 304 to execute the APC operation for every scan. The APC operation is executed while the APC signal is at a high level. By executing the APC operation in the non image forming area, the photosensitive drum 102 is prevented from being irradiated with light emitted in the APC operation. In the present embodiment, the light emission of the laser light source 201 for the APC operation is performed at the timing of the time point T3, in synchronization with the FG reference signal generated in the non image forming area (S302 in FIG. 5C). After the BD detection, the APC signal is set at a low level from the high level, so that the laser light source 201 is turned off. Thereafter, the CPU 303 can execute the APC operation in the non image forming area by causing the light emission of the APC after a predetermined time period has elapsed, based on the detected BD signal.

[Startup of Rotatable Polygonal Mirror]

FIG. 7 illustrates execution timings of the control in the present embodiment, together with step numbers in the flowchart illustrated in FIG. 5A. In FIG. 7, the horizontal axis represents time, and the vertical axis represents the rotational speed of the rotary polygon mirror 204. A print job is started, the rotary polygon mirror 204 starts rotating, and with a timing when the rotational speed reaches the first speed, the CPU 303 performs the detection processing of Reference FG edge (S104). Thereafter, with a timing when the rotational speed of the rotary polygon mirror 204 converges within a predetermined range including the target speed, the CPU 303 performs the BD detection (S107).

In the present embodiment, a surface number of the rotary polygon mirror 204 is four, and the number of pulses of the FG signal output in one rotation of the rotary polygon mirror is six. A motor (not illustrated) configured to rotate the rotary polygon mirror 204 includes a rotor (not illustrated) which is provided with a magnet for generating the FG signal. A positional relationship between the rotary polygon mirror 204 and the magnet is unchanged after the magnet is assembled. Therefore, if the magnet is mounted at a position that causes the FG signal to be output in the image forming area in a case where the surface number of the rotary polygon mirror 204 is the same as the number of pulses of the FG signal in one rotation of the rotary polygon mirror 204, the FG reference signal cannot be generated in the non image forming area. In the present embodiment, the surface number of the rotary polygon mirror 204 is made different from the number of pulses of the FG signal in one rotation of the rotary polygon mirror 204. This configuration allows at least one of multiple pulses of the FG signal to rise in the non image forming area.

When the detection processing of Reference FG edge (S104) is performed, the laser light source 201 is brought into a continuous lightening state (S201 to S208 in FIG. 5B). Therefore, the photosensitive drum 102 is irradiated with laser beams. The CPU 303 identifies an FG signal for generating the FG reference signal. Thereafter, the CPU 303 continues to detect an edge of FG signal corresponding to the non image forming area in order to count up the counter. At a timing of performing the BD detection (S107), the laser light source 201 is turned on with reference to the FG reference signal corresponding to the non image forming area. Therefore, the photosensitive drum 102 is not irradiated with the light from the laser light source 201. Before S105 in FIG. 5A, charge voltage, development voltage, and transfer voltage are not applied. Without these voltages applied, neither formation of a toner image by development on the photosensitive drum 102 nor transfer of a toner image onto the intermediate transfer belt 107 occurs even when the photosensitive drum 102 is irradiated with the light from the laser light source 201. After the process for the detection processing of Reference FG edge (S104) is performed, and the laser light source 201 is turned off, the charge voltage, the development voltage, and the transfer voltage are applied. This configuration can prevent formation of an image on the photosensitive drum 102 and the intermediate transfer belt 107. Further, the detection processing of Reference FG edge (S104) is made to executed immediately after the start of rotation of the rotary polygon mirror 204 (with a timing when the rotational speed reaches the first speed). This configuration can bring forward a timing of applying the charge voltage, the development voltage, and the transfer voltage. Therefore, a startup time of the entire image forming apparatus can be shortened. As described above, according to the present embodiment, the startup time of the entire image forming apparatus can be shortened without forming an unnecessary image on the photosensitive member.

[Embodiment 2]

In Embodiment 2, immediately after the rotation of the rotary polygon mirror 204 is started, a time interval until the BD signal comes to be detected using an optionally selected edge of the FG signal is measured, and a waiting time period corresponding to a time period corresponding to the non image forming area is calculated. After the rotation of the rotary polygon mirror 204 is stabilized, the laser light source 201 emits light according to the calculated waiting time period. With this configuration, a timing of emitting from the laser light source 201 is controlled so that the light is emitted within the non image forming area in the BD detection. Hereafter, differences from Embodiment 1 are described.

[General Operation]

FIG. 8A illustrates a process performed by the CPU 303 when starting up the rotary polygon mirror 204. Differences from Embodiment 1 are operation of the detection processing of Reference FG edge and calculating a light emission time period Ts in S401, and operation of the BD detection in S501. Processes of the same steps in FIG. 5A are denoted by the same step numbers and are not described.

[Operation Mode 1: S401]

FIG. 8B illustrates an operation process for the detection processing of Reference FG edge executed by the CPU 303 in S401 and calculation of the light emission time period Ts. When the operation of the detection processing of Reference FG edge and the calculation of the light emission time period Ts is started, the CPU 303 executes a process of S402 and subsequent steps. In S402, the CPU 303 instructs the laser drive circuit 304 to cause the laser light source 201 to emit light beams in order to detect the BD signal. In S403, the CPU 303 determines whether a rising edge of the FG signal generated by the mirror driving unit 305 has been detected. When the CPU 303 determines in S403 that no rising edge of the FG signal has been detected, the CPU 303 returns the process to S403. When the CPU 303 determines that a rising edge of the FG signal has been detected, the CPU 303 advances the process to S404. The CPU 303 regards an FG signal, which is first detected after the rotational speed of the rotary polygon mirror 204 reaches the first speed and the laser light source 201 is turned on, as the FG reference signal. After starting the generation of the FG reference signal, the CPU 303 counts up the FG count value as in Embodiment 1. When the FG count value reaches six, the CPU 303 resets the FG count value to one and outputs a next FG reference signal. By detecting the rising edge of the FG signal, the CPU 303 counts up the FG count value. In S404, the CPU 303 starts counting the CLK signal generated by the clock signal generation portion 308. Assume that a time point when the count of the CLK signal is started (timing of the rising edge of the FG signal) is denoted by T0'. The CPU 303 starts counting the FG count value at the time point T0' and generates the FG reference signal with a timing when the FG count value is reset from six to one.

In S405, the CPU 303 determines whether the BD signal has been detected. When the CPU 303 determines in S405 that the BD signal has not been detected, the CPU 303 returns the process to S405. When the CPU 303 determines that the BD signal has been detected, the CPU 303 advances the process to S406. In S406, the CPU 303 acquires a count value Tw of the CLK signal counted from the time point T0'. The count value Tw is acquired as a measured value which is substantially equal to a time interval between the rising edge of the FG signal detected in S403 and (a falling edge of) the BD signal detected in S405 (illustrated as an FG-BD interval). The count value Tw is a difference between a timing when the FG signal is first detected and a timing when the BD signal is first detected, after the rotational speed of the rotary polygon mirror 204 reaches the first speed and the laser light source 201 is turned on. The CPU 303 calculates the light emission time period Ts from the count value Tw using the following expression (1).

Here, the light emission time period Ts is a waiting time period after the rotational speed of the rotary polygon mirror 204 has reached the target speed and until the laser light source 201 starts emitting light with reference to the rising edge of the FG signal. A value V1 is the first speed of the rotary polygon mirror 204 serving as a reference to determine in S103 whether the rotational speed of the rotary polygon mirror 204 has reached the first speed. A value Vtar is the target speed of the rotary polygon mirror 204 serving as a reference to determine in S106 whether the rotational speed of the rotary polygon mirror 204 has reached the target speed. A time period Tb is a time period after the scanning laser beams are entered onto an end portion of the non image forming area on a side where the BD 207 is provided until the BD signal is detected, under a condition where the rotational speed of the rotary polygon mirror 204 is the first speed V1. In consideration of variations, this time period Tb may be a time period taken for the scanning with the laser beams from the end portion of the non image forming area up to a predetermined position upstream of the BD 207 in the main-scanning direction, as with the time period T2 in Embodiment 1.

$$Ts=(Tw-Tb) \times V1/Vtar \qquad \text{Expression (1)}$$

In S407, the CPU 303 turns off the laser light source 201, and finishes the control. The values V1, Vtar and Tb are predetermined and stored in a storage portion included in the CPU 303.

Subsequent to S403, the CPU 303 generates the FG reference signal so that a pulse is output once for every rotation of the rotary polygon mirror 204, based on a pulse of the FG signal detected in S403. In the present embodiment, six pulses of the FG signal are output for every rotation of the rotary polygon mirror 204. The CPU 303 therefore selects one pulse for six pulses of the FG signal, as the FG signal for generating the FG reference signal. In the present embodiment, the CPU 303 selects any one of the six pulses of the FG signal and generates a first FG reference signal in synchronization with the selected FG signal, so as to subsequently continue to select the FG signal regarded as the time point T0' serving as a reference. The CPU 303 resets the count value to one with a timing of generating the FG reference signal, as in the process described as S207 in FIG. 5B. The CPU 303 increments the count value by one for every detection of the FG signal and resets the count value to one when detecting a pulse immediately following the count value reaching six. The CPU 303 generates the FG reference signal in synchronization with the FG signal generated by the mirror driving unit 305 while the count value takes one.

In the present embodiment, the CPU 303 generates the FG reference signal in response to the FG signal the rising edge of which is detected after the rotational speed of the rotary polygon mirror 204 reaches the first speed. In such a case, the detected FG signal may be a FG signal output within the image forming area. The CPU 303 causes the laser light source 201 to emit light after waiting for a waiting time period Tw, so that the laser light source 201 can emit light in the non image forming area even when the FG reference signal is a signal generated based on the FG signal output within the image forming area. Therefore, in the present embodiment, the laser light source 201 can emit light within the non image forming area even in a case where the surface number of the rotary polygon mirror 204 is the same as the number of pulses of the FG signal output while the rotary polygon mirror 204 makes one rotation. The surface number of the rotary polygon mirror 204 may be made different from the number of pulses of the FG signal output while the rotary polygon mirror 204 makes one rotation, as in Embodiment 1.

[Startup of Rotatable Polygonal Mirror]

FIG. 9A illustrates a timing diagram of detection processing of Reference FG edge in the present embodiment and the calculation of the light emission time period Ts. In FIG. 9A, (i) illustrates the CLK signal generated by the clock signal generation portion 308. In FIG. 9A, (ii) illustrates turning on of the laser light source 201 by the laser drive circuit 304 (Turn on laser), a high level indicates turning on and a low level indicates turning off. In FIG. 9A, (iii) illustrates the FG signal generated by the mirror driving unit 305. In FIG. 9A, (iv) illustrates the BD signal output from BD 207. In FIG. 9A, (v) illustrates the FG count value counted by the CPU 303. In FIG. 9A, (vi) illustrates the FG reference signal generated in synchronization with the FG signal detected by the CPU 303 in the process of S403. For all of the aboves, the horizontal axis represents time. In the present embodiment, the rising edge of the FG signal input immediately after the rotational speed of the rotary polygon mirror 204 reaches the first speed (S103) is regarded as the time point T0' serving as a reference. A time interval Tw between (a falling edge of) the BD signal obtained immediately after the time point T0' and the time point T0' is then measured. By the operation described above, the time period Ts from the rising edge of the FG reference signal to the non image forming area of a next scan in the operation mode 2 is calculated.

[Operation Mode 2: S501]

FIG. 8C illustrates a process for BD detection performed by the CPU 303 in S501. Upon starting the operation of the BD detection, the CPU 303 starts a process of S502 and subsequent steps. In S502, the CPU 303 determines whether the FG reference signal has been generated. When the CPU 303 determines in S502 that the FG reference signal has not been generated, the CPU 303 returns the process to S502.

When the CPU 303 determines that the FG reference signal has been generated, the CPU 303 advances the process to S503 and starts counting the CLK signal. In S503, the CPU 303 measures an elapsed time from S502 and determines whether the light emission time period Ts calculated in S401 has elapsed. When the CPU 303 determines in S503 that the light emission time period Ts has not elapsed, the CPU 303 returns the process to S503. When the CPU 303 determines that the light emission time period Ts has elapsed, the CPU 303 advances the process to S504. In S504, the CPU 303 starts the APC sequence and causes the laser light source 201 to emit light by the laser drive circuit 304. In S505, the CPU 303 determines whether the BD signal is detected. When the CPU 303 determines in S505 that the BD signal is not detected, the CPU 303 returns the process to S505. When the CPU 303 determines that the BD signal is detected, the CPU 303 advances the process to S506. In S506, the CPU 303 finishes the APC sequence and causes the laser light source 201 to turn off by the laser drive circuit 304. The APC sequence operates as in Embodiment 1 and thus is not described.

FIG. 9B is a timing diagram when executing the operation mode 2 of S501. In FIG. 9B, (i) to (v) are the same graphs as the graphs of (i) to (v) in FIG. 6B and thus are not described. After the rotational speed of the rotary polygon mirror 204 reaches the target speed, the CPU 303 waits until the light emission time period Ts has elapsed, with reference to the rising edge of the FG reference signal (timing of T3), and thereafter outputs the APC signal. When the laser drive circuit 304 causes the laser light source 201 to emit light, the CPU 303 detects the BD signal. By the above mentioned operation, the CPU 303 causes the laser light source 201 to emit light after the light emission time period Ts until the laser beams reach the non image forming area has elapses, with reference to the rising edge of the FG reference signal. This configuration allows the CPU 303 to control a timing of emitting light by the laser light source 201 within the non image forming area. As described above, according to the present embodiment, the startup time of the entire image forming apparatus can be shortened without forming an unnecessary image on a photosensitive member.

According to the present invention, the startup time of the entire image forming apparatus can be shortened without forming an unnecessary image on a photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-205214, filed Oct. 19, 2016, which is hereby incorporated by reference herein in its entirety.

What is claimed is:

1. An image forming apparatus comprising:
a light source;
a rotary polygon mirror configured to scan with a laser beam emitted from the light source;
a driving unit configured to drive the rotary polygon mirror and output a first signal corresponding to rotation of the rotary polygon mirror;
a photosensitive member on which a latent image is formed by scanning with the laser beam by the rotary polygon mirror;
a charging unit configured to charge the photosensitive member before the latent image is formed on the photosensitive member;
a developing unit configured to develop the latent image formed on the photosensitive member with toner to form a toner image;
a detecting unit provided in a second region obtained by excepting a first region, which is to be scanned with the laser beam to form the latent image on the photosensitive member, from a range to be scanned with the laser beam, the detecting unit being configured to output a second signal in response to detection of the laser beam;
a control unit configured to control a light amount of the laser beam to be emitted from the light source onto the second region for every scan of the laser beam; and
the control unit which:
i) starts up the rotary polygon mirror based on the first signal output by the driving unit;
ii) causes the light source to emit the laser beam while controlling a rotational speed of the started rotary polygon mirror based on the first signal to acquire the second signal output from the detecting unit;
iii) acquires a phase relation between the first signal and the second signal;
iv) turns off the light source after acquiring the phase relation;
v) causes the developing unit to apply an electric charge to the toner and causes the charging unit to charge the photosensitive member, after turning off the light source;
vi) makes the laser beam to enter onto the detecting unit without exposing the photosensitive member based on the phase relation between the second signal and the first signal, in response to the rotational speed of the rotary polygon mirror reaching a target speed by control of the rotary polygon mirror with the first signal;
vii) controls the rotational speed of the rotary polygon mirror with the output second signal, in response to the laser beam being entered onto the detecting unit;
viii) turns on the light source in response to the rotational speed of the rotary polygon mirror reaching a first speed lower than the target speed of the rotary polygon mirror, and then generates a third signal based on the first signal which is detected after a first time period elapses from a first detection of the second signal and before a second time period longer than the first time period elapses; and
ix) controls to start image formation in response to the rotational speed of the rotary polygon mirror converging within a predetermined range including the target speed.

2. The image forming apparatus according to claim 1, wherein
the first time period and the second time period are set corresponding to the second region.

3. The image forming apparatus according to claim 1, wherein
the control unit causes the light source to emit the laser beam so as to control the light amount, with a timing of generating the third signal in response to the rotational speed of the rotary polygon mirror reaching the target speed.

4. The image forming apparatus according to claim 1, wherein
the driving unit outputs a predetermined number of pulses of the first signal while the rotary polygon mirror rotates once, and the control unit continuously generates the third signal on a cycle based on the predetermined number of pulses of the first signal after starting generation of the third signal.

5. The image forming apparatus according to claim 4, wherein a surface number of the rotary polygon mirror is different from the predetermined number of pulses of the first signal.

* * * * *